April 21, 1953    J. S. VOIGT    2,635,728
LEVER AND LINKAGE ASSEMBLY FOR CLUTCHES
Filed Feb. 24, 1947    2 SHEETS—SHEET 1
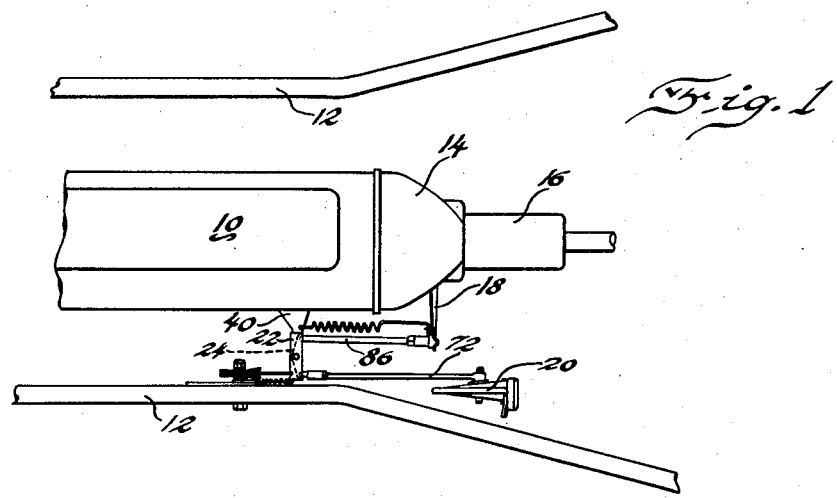
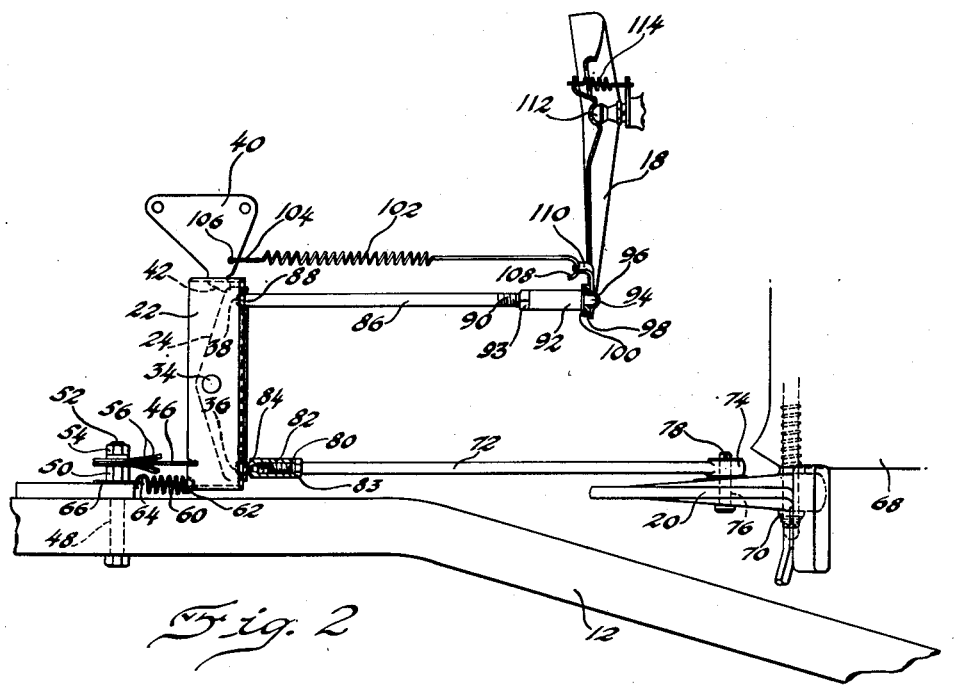
JOHNSTON STUART VOIGT
INVENTOR.
BY Carl J. Barbee
HIS ATTORNEY April 21, 1953  J. S. VOIGT  2,635,728
LEVER AND LINKAGE ASSEMBLY FOR CLUTCHES
Filed Feb. 24, 1947  2 SHEETS—SHEET 2
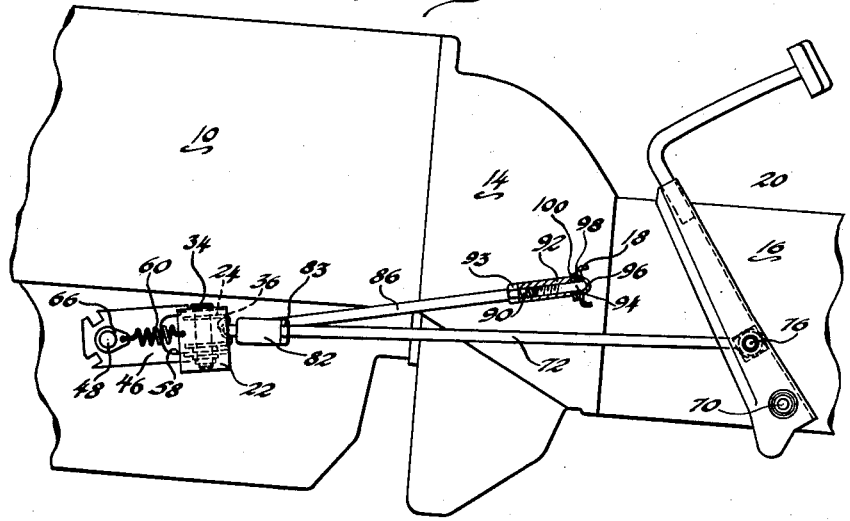
JOHNSTON STUART VOIGT
INVENTOR.
BY Carl J. Barbee
HIS ATTORNEY Patented Apr. 21, 1953

2,635,728

UNITED STATES PATENT OFFICE 2,635,728

LEVER AND LINKAGE ASSEMBLY FOR CLUTCHES

Johnston Stuart Voigt, Kenosha, Wis., assignor to Nash-Kelvinator Corporation, Kenosha, Wis., a corporation of Maryland Application February 24, 1947, Serial No. 730,612

10 Claims. (Cl. 192—99)

1

This invention relates to clutch control and more particularly to a beam type clutch control for a motor vehicle.

It is an object of this invention to provide a clutch control mechanism which will transmit a minimum amount of engine vibrations to the clutch pedal.

It is another object of this invention to provide a clutch control for a motor vehicle which is practically frictionless and, thus, very easy to operate.

It is a further object of this invention to provide a clutch control for a motor vehicle which will require little revision of the parts thereof.

It is still another object of this invention to provide a clutch control for a motor vehicle which is simple in design, economical to manufacture and easy to install in the ordinary motor vehicle.

Other objects and advantages of this invention will be apparent from a consideration of the following description, claims, and drawings of which there are two sheets, and in which:

Figure 1 is a plan view of the invention as associated with the frame and power plant of a motor vehicle;

Figure 2 is an enlarged view of the invention as shown in Figure 1;

Figure 3 is a side elevational view partially in section of the invention shown in Figures 1 and 2; and Figure 4 is an elevational view of a portion of the invention partially in section.

The matter of transmitting engine vibrations to the frame and manually controlled means of a motor vehicle has been a constant problem to the motor vehicle industry. Specifically, this invention is a solution to the problem of engine vibrations being transmitted through the clutch control means to the manually controlled clutch pedal and the frame of the vehicle.

Illustrated in Figure 1 is a motor vehicle engine 10 positioned between frame side rails 12 and having the ordinary clutch 14 secured to the back thereof with a transmission 16 secured to the back of the clutch 14. Associated with the engine 10, clutch 14 and the frame of the motor vehicle is the manually controlled clutch mechanism which is comprised of a clutch throwout arm 18, a foot pedal 20 and connecting means interposed therebetween.

These connecting means are comprised of a boxlike beam 22 which is open at its forward and rearward sides (Figure 4) to receive the beam lever 24. Lever 24 and beam 22 are metal

2 stampings having aligned apertures in their upper and lower sides. Within these apertures in the lever 24 is rigidly secured a sleeve 26 (Figure 4) which has a peripheral flange 28 positioned between the lower surface 30 of lever 24 and the lower inside surface 32 of beam 22. Flange 28 acts as a bearing between the said surface of beam 22 and lever 24. Extending through the apertures in beam 22 and through sleeve 26 is a pin 34 around the center of which lever 24 rotates. Adjacent its ends lever 24 is provided with rearwardly presented cup-like depressions 36 and 38. Lever 24 is positioned substantially horizontally between engine 10 and the one side rail 12 by beam 22 which is held in a like position by a hook plate 40 which is rigidly secured to engine 10. The outer hook-like end 42 (Figure 2) of plate 40 is positioned within the aperture 44 (Figure 4) extending through the end of beam 22 adjacent engine 10. The end of beam 22 remote from engine 10 is carried by a flexible fulcrum plate 46 which, in turn, is carried by bolt 48 which passes through side rail 12. Bolt 48 is rigidly secured within aligned apertures in rail 12 by nut 50 which is turned on its inner threaded end 52 and plate 46 is positioned on bolt 48 between nut 50 and nut 54 which is turned on end 52 of bolt 48. Rigid restraining ramp members 56 are positioned on bolt 48 on either side of plate 46 to prevent excessive distortion thereof. Plate 46 in its rearward end is provided with a cut-out portion 58 (Figure 3) designed to receive beam 22 and prevent vertical movement thereof. Beam 22 is held within cut-out portion 58 by tension spring 60 which has its one end 62 hooked through an aperture in the outer side of beam 22 and its other end 64 hooked through an aperture in plate 66 which is rigidly secured to bolt 48.

The lower end of pedal 20 is rotatably secured to frame member 68 as at 70. A rigid link 72 extends between lever 20 and lever 24 and has enlarged end 74 adjacent pedal 20 which is provided with an aperture. Pin 76 extends through aligned apertures in pedal 20 and through the aperture formed in end 74 of link 72. End 74 is held on pin 76 by a cotter pin extending through an aperture 78 in the end of pin 76. The end 80 of link 72 remote from pedal 20 is threaded and an internally threaded cylindrical member 82 is turned thereon. Member 82 is provided with a rounded end 84 which is positioned in the depression 36 of lever 24, thus, a one-way connection is formed between pedal 20 and lever 24 and means for varying the length of link 72 is provided inasmuch as member 82 may be turned on threaded end 80 any one of several distances. A nut 83 is turned on threaded end 80 so it may be turned into abutment with member 82 to secure same in any desired position at end 80 of link 72. A second link 86 has a rounded end 88 which is positioned within depression 38 of lever 24 and the other end 90 of link 86 is threaded as is end 80 of link 72. On end 90 is positioned a cylindrical member 92 which is identical to member 82 and has a rounded end 94 which is positioned within cup-like depression 96 formed in the outer end of throwout arm 18. A resilient washer 98 and a rigid washer 100 are telescopically positioned around portion 94 of member 92 to provide a cushion between member 92 and throwout arm 18, thus, a one-way drive connection is formed between beam 24 and throwout arm 18 of the clutch 14. Member 92 may be utilized to vary the length of link 86 as described above in relation to link 72 and member 82. Nut 93 is positioned on end 90 of link 86 and serves to secure member 92 thereon in any one of several positions. A tension spring 102 has its forward end 104 positioned within an aperture 106 formed in plate 40 and has its rearward end 108 positioned within an aperture formed in forwardly turned portions 110 of throwout arm 18.

Throwout arm 18 pivots around ball member 112 within clutch 14 and a tension spring 114 is hooked between the throwout lever 18 and the stud on which ball member 112 is formed adjacent the inside end of throwout arm 18 to rotate said arm in one direction.

It will be noted in Figure 3 that the pin 76 passes through the pedal lever 20 between the center of said pedal and the means 70 which connect the pedal 20 to the frame member 68. Rod 72 is connected to pedal 20 in this position so that when pedal 20 is rotated in a counterclockwise direction, the leverage provided will increase as the pin 76 approaches the plane passing through the centers of connection means 70 and depression 36 of beam 24.

In this manner the inventor has provided a clutch control for a motor vehicle which consists of a push rod rotatably connected to a manually controlled pedal to transmit movement to a beam lever which is rotated thereby to push a second push rod against the clutch throwout lever. The beam lever is resiliently mounted between the engine and the frame so that a minimum of the vibrations of the engine will be transmitted to the frame therethrough. The connections between the push rod extending from the pedal lever to the beam lever and the push rod that extends between the beam lever and the throwout lever are ball connections so that independent movement of any of the members will not be transmitted through the push rods. It will be noted that the ball ends of the rods are loosely positioned in the cup-like portions and they are held therein as a result of tension exerted by spring 102 which continuously urges the outer end of throwout arm 18 forwardly, thus, holding the ball ends 88 and 94 of rod 86 in their respective depressions and which, in turn, continuously urges lever 24 in a counterclockwise direction to hold the ball 84 of rod 72 in the depression 36.

Numerous modifications will at once occur to those skilled in the art and it is contemplated that any modifications falling within the scope of the appended claims are expressly reserved even though the invention has been described in considerable detail in the modification disclosed.

What is claimed and is desired to be secured by Letters Patent is:

1. In a motor vehicle, an engine, a frame, a clutch, a control arm for said clutch, a foot pedal lever, a support member carried by said engine and frame, a lever carried by said support member and rotatable about an axis transverse thereto, a link extending between said pedal and one end of said rotatable lever, and a link extending between another end of said rotatable lever and said control arm.

2. In a motor vehicle, an engine, a frame, a clutch, a throwout arm, a support member positioned horizontally between said engine and said frame, for said clutch, a pedal lever, a lever rotatable about its vertical axis and carried by said support member, a rigid link extending between said pedal lever and one end of said rotatable lever, and a rigid link extending between the other end of said rotatable lever and said clutch throwout arm.

3. In a motor vehicle, an engine, a frame, a clutch, a throwout arm for said clutch, a foot pedal lever carried by said frame, a beam positioned between the engine and frame and carried thereby, a lever carried by said beam and rotatable about its vertical axis, a rigid link extending between said foot pedal lever and one end of said rotatable lever, and a rigid link extending between said throwout arm and the other end of said rotatable lever.

4. In a motor vehicle, an engine, a frame, a clutch, a throwout arm for said clutch, a foot pedal lever carried by said frame, a beam positioned horizontally between said engine and said frame and carried thereby, a lever carried by said beam and rotatable about an axis transverse thereto, a rigid link extending between said pedal lever and one end of said rotatable lever, and a rigid link extending between said throwout arm and the other end of said rotatable lever.

5. In a motor vehicle, an engine, a frame, a clutch, a throwout arm for said clutch, a pedal lever carried by said frame, a support member carried by said engine and said frame therebetween, a lever rotatably carried by said support member and rotatable about an axis transverse thereto, said rotatable lever having cup-like depressions formed in the ends thereof and said throwout arm having a cup-like depression formed in the outer end thereof, a rigid link extending between said pedal lever and said rotatable lever and having a rounded end positioned within one of said cup-like depressions in said rotatable lever, a rigid link having rounded ends extending between said rotatable lever and said throwout arm with said ends positioned within the cup-like depressions thereof.

6. In a motor vehicle, an engine, a frame, a clutch, a throwout arm for said clutch, a foot pedal lever rotatably carried by said frame, a beam extending between said engine and said frame, a rotatable lever carried by said beam and having cup-like depressions in the ends thereof and rotatable about an axis transverse to said beam, said throwout arm having a cup-like depression formed in the outer end thereof, a rigid link extending between said pedal lever and said rotatable lever and having a rounded end positioned within the cup-like depression in one end of the rotatable lever, a rigid link having rounded ends extending between said throwout arm and said rotatable lever with said ends positioned within the cup-like depressions of said arm and lever, and resilient means for maintaining the rounded ends of said rigid links within the cup-like depressions.

7. In a motor vehicle, an engine, a clutch, a frame, a throwout arm for said clutch, a foot pedal lever rotatably carried by said frame, a beam positioned between said engine and said frame and movably carried thereby, a lever carried by said beam and rotatable about an axis transverse thereto, said rotatable lever having cup-like depressions formed in the ends thereof, said throwout arm having a cup-like depression formed in the outer end thereof, a rigid link rotatably secured to said foot pedal lever and extending to one end of said rotatable lever and having a rounded end positioned within one of the cup-like depressions in said rotatable lever, a rigid link having rounded ends extending between the other cup-like depression of said rotatable lever and the cup-like depression of said throwout arm, and resilient means secured to said throwout arm for maintaining said rounded ends within the cup-like depressions associated therewith.

8. In a motor vehicle, an engine, a clutch, a frame, a throwout arm associated with said clutch, a foot pedal lever rotatably connected to said frame, a beam positioned between said engine and said frame and movably carried thereby, a lever carried by said beam and rotatable about an axis transverse thereto, the lever carried by the beam having cup-like depressions formed in the ends thereof, said throwout arm having a cup-like depression formed in the outer end thereof, a rigid link having a rounded end positioned within one of the cup-like depressions in the lever carried by the beam and having its other end rotatably secured to said foot pedal lever between the center thereof and the connection between said foot pedal lever and said frame, means for adjusting the length of said rigid link, a second rigid link having its ends rounded and extending between the other cup-like depression of the lever carried by the beam and the cup-like depression formed in the throwout arm, means for varying the length of said second link, and resilient means for maintaining the rounded ends of said links within the cup-like depressions associated therewith.

9. In a motor vehicle, an engine, a frame, a clutch, a throw-out arm for such clutch, a pedal lever carried by said frame, a support member positioned between said engine and frame, a lever carried by said support member and rotatable about an axis transverse thereto, said rotatable lever having depressions formed in the ends thereof, a rigid link connected at its one end to said pedal lever and having its other end rounded and positioned in one of said depressions, a second link connected at its one end to said throw-out arm and having its other end rounded and positioned in one of said depressions, and means for maintaining the rounded ends of said links in said depressions.

10. In a motor vehicle, an engine, a frame, a clutch, a throw-out arm for said clutch, a pedal lever carried by said frame, a beam extending between said engine and said frame, a rotatable lever carried by said beam and rotatable about an axis transverse to said beam, said rotatable lever having depressions formed in the ends thereof, a rigid link extending between said pedal lever and said rotatable lever and having a rounded end positioned in the depression in one end of the rotatable lever, a second link extending between said throw-out arm and said rotatable lever and having a rounded end positioned within the depression in the other end of rotatable lever, and means for maintaining the rounded ends of said links within the depressions.

JOHNSTON STUART VOIGT.

References Cited in the file of this patent

UNITED STATES PATENTS

| Number | Name | Date |
|---|---|---|
| 1,740,265 | Putrey | Dec. 17, 1929 |
| 1,881,067 | Summers | Oct. 4, 1932 |
| 1,999,262 | Tenney | Apr. 30, 1935 |
| 2,005,269 | Schildknecht | June 18, 1935 |
| 2,232,302 | Auten | Feb. 18, 1941 |
| 2,275,388 | Wemp | Mar. 3, 1942 |
| 2,311,997 | Pearson | Feb. 23, 1943 |